United States Patent [19]

Popeil

[11] 4,079,917
[45] Mar. 21, 1978

[54] WHIPPER

[75] Inventor: Samuel J. Popeil, Chicago, Ill.

[73] Assignee: Popeil Brothers, Inc., Chicago, Ill.

[21] Appl. No.: 621,852

[22] Filed: Oct. 14, 1975

Related U.S. Application Data

[63] Continuation of Ser. No. 432,451, Jan. 11, 1974, abandoned.

[51] Int. Cl.$^2$ ............................ B01F 7/18; B01F 7/30
[52] U.S. Cl. .................................... 366/244; 366/288
[58] Field of Search ............... 259/1 A, 102, 108, 112, 259/116–124; 403/359, 361, 365, 372

[56] References Cited

U.S. PATENT DOCUMENTS

| 1,612,281 | 12/1926 | Goetz | 259/118 |
| 2,148,399 | 2/1939 | Crissey | 259/118 |
| 2,931,632 | 4/1960 | De Angelis et al. | 259/1 A |
| 3,215,410 | 11/1965 | McMaster et al. | 259/104 |
| 3,328,005 | 6/1967 | McMaster et al. | 259/114 |
| 3,456,276 | 7/1969 | Spohr | 259/1 A X |
| 3,537,691 | 11/1970 | Tsuruta et al. | 259/108 |
| 3,660,741 | 5/1972 | Walter | 259/1 A X |

FOREIGN PATENT DOCUMENTS

| 243,069 | 11/1946 | Switzerland | 259/118 |
| 17,676 | 8/1910 | United Kingdom | 259/118 |

Primary Examiner—Robert W. Jenkins
Attorney, Agent, or Firm—Dominik, Knechtel, Godula & Demeur

[57] ABSTRACT

A whipper is shown having a crank secured to a gear housing assembly which in turn orbitally drives a beater plate, the beater plate having three beaters secured thereto in removable relationship. The gear housing assembly is proportioned to fit atop a substantially cylindrical bowl, and the beaters with their included tines are proportioned to extend downwardly in open ended fashion. The gear housing assembly includes a housing which is removably secured to the combination of the beater plate and the ring gear plate by means of a bayonet-type fastener at the periphery of both which coacts with the housing, and more particularly the crank to removably secure the same. An ejector is provided within the housing to assist in removing the crank, and free the housing for rotation with respect to the combination of the ring gear plate and beater plate and associated gears to separate the same for purposes of cleaning. The beaters are secured to the beater gears by means of a beater spline which coacts with a snap-head-type fastener at the upper portion of the beater. Additionally, an egg separator may be used to coactingly engage the bowl.

28 Claims, 19 Drawing Figures

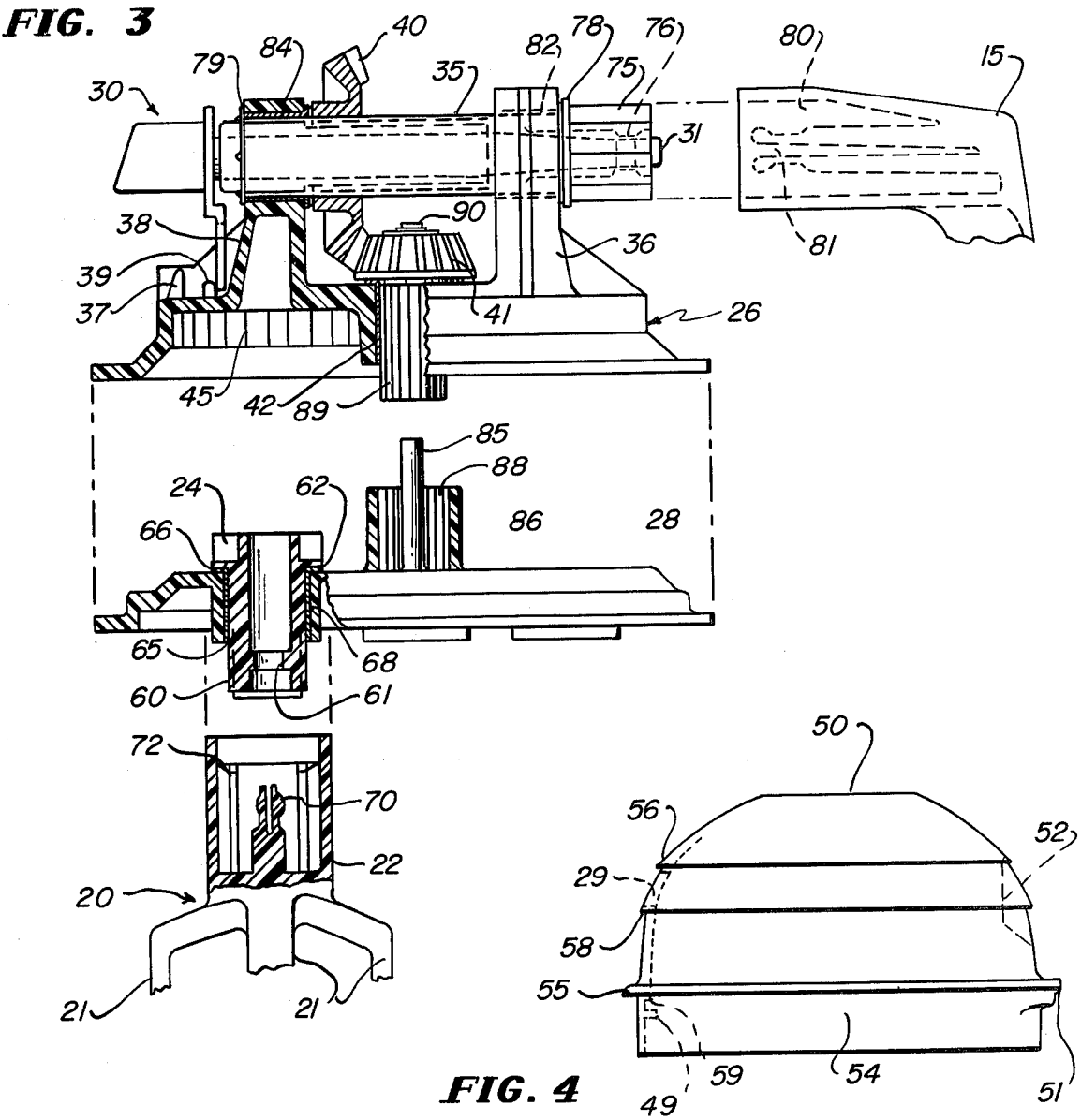
FIG. 3
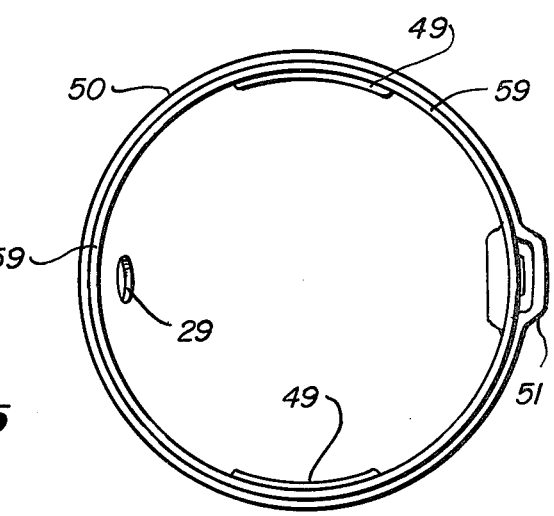
FIG. 4
FIG. 5

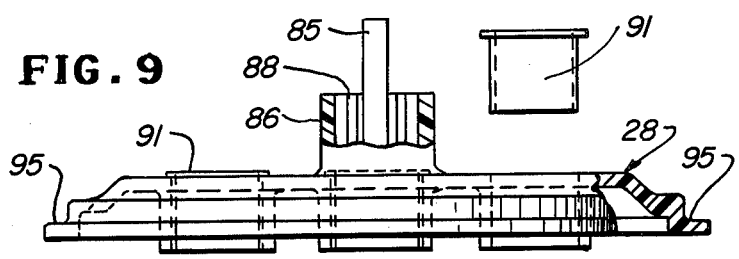
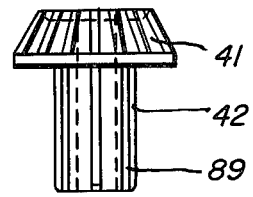
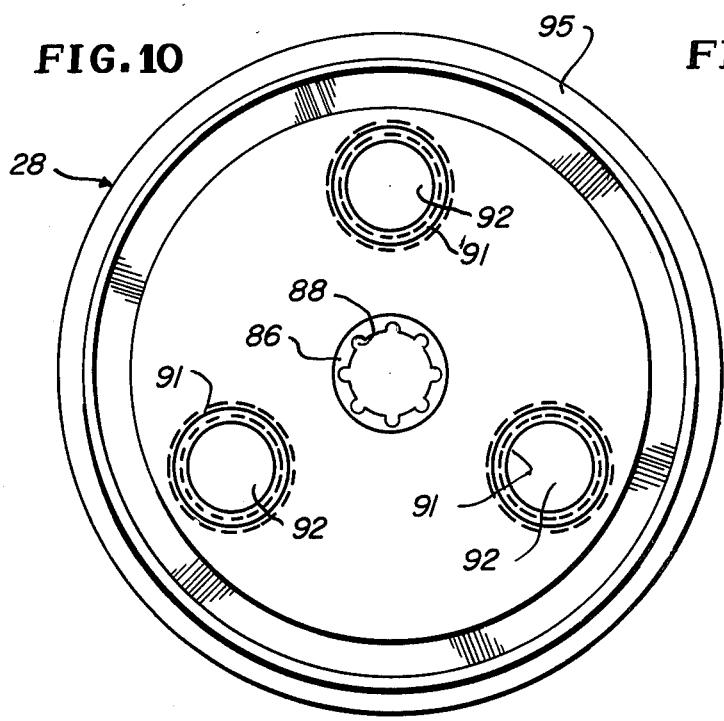
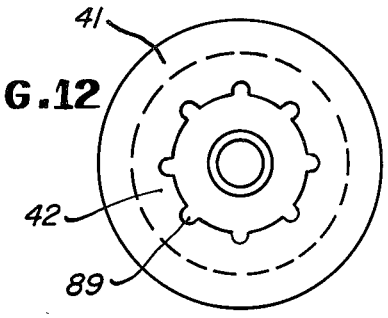
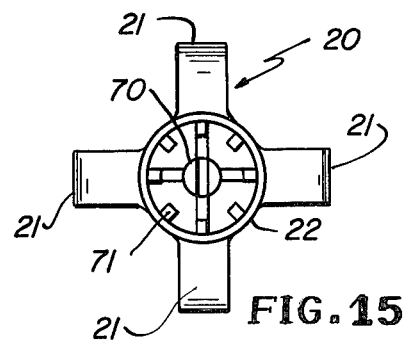
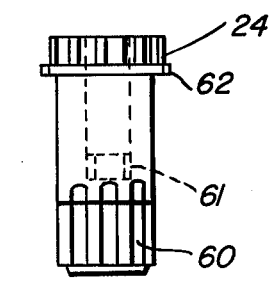
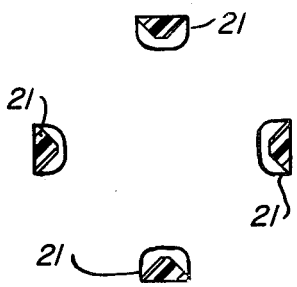
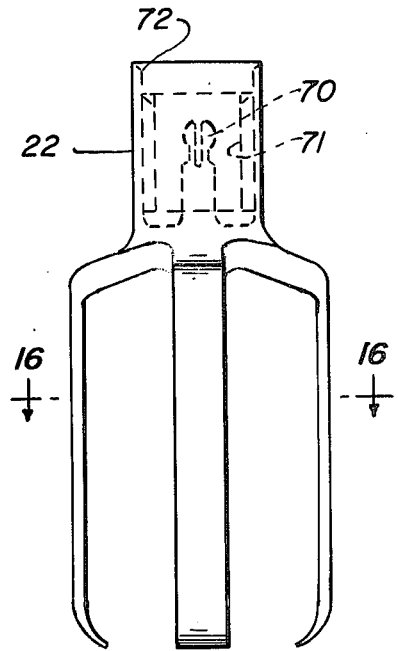

WHIPPER

This is a continuation, of application Ser. No. 432,451 filed Jan. 11, 1974 now abandoned.

BACKGROUND OF THE INVENTION

1. Field of Invention

The present invention relates to whippers, and more particularly the hand crank variety which are combined with a bowl or pitcher, and having a plurality of beaters each with a plurality of tines which are orbitally moved throughout the bowl while being rotated therein. Relevant patent literature appears in Class 259, subclasses 29, 35, 116, and 118 and elsewhere and the patent and commercial literature directed to whippers, agitators, and the like.

2. Description of the Prior Art

The prior patent literature is representatively disclosed in French Pat. No. 1020683 and Swiss Pat. No. 243069. As to the United States patent literature, patents issued as early as U.S. Pat. Nos. 374,706 and 1,192,426 disclose various forms of combined orbital and rotary beating. In principle, the prior art illustrates a plurality of members which are rotated by means of clusters of gears working against a single ring gear, whether the ring gear relationship be internal or external. In addition, a generally orbital motion is defined by clusters of the rotary members.

Upon tracing the gear trains, it becomes apparent that a significant amount of inherent mechanical friction exists, and thus effort is dissipated through the relationship of the gears. It follows, therefore, that more effort is required to actuate the beaters. Furthermore, many if not most of the examples of the prior art disclose beaters which are awkward to wash, and are of such a construction that inherently they cannot be molded of plastic.

A recent development with regard to plastic beaters may be found in U.S. Pat. Nos. 3,215,410 and 3,328,005 but as will be observed, the mechanism for securing the beaters as represented in these patents is essentially a cost provoking metal shaft. Just the mating of the metal to the plastic tines involves a cost increment, as well as a weak point to detract the overall efficiency and economy of the beaters as shown in the subject patents.

Finally, there appears to have been little effort or thought directed in connection with the beaters exemplified by the foregoing patents to a unit which can be quickly disassembled, and easily washed, and reassembled for further drying even while stored in a kitchen cabinet. Also, the hand manipulated orbital type beaters of the prior art do not possess a combination of high speed and total penetration of the beaters within the bowl to significantly reduce the effort required as well as the time to conclude the beating or whipping operation.

SUMMARY

The invention is directed to a whipper having a plurality of orbitally and rotated beaters. A plurality of beaters are employed, each of which has an open ended lower portion and a plurality of tines. With a three-beater and thus three-legged construction, a free standing of the gear housing assembly and beater permits easy self draining. The gear housing is a dome-like member which is secured by means of a bayonet-like fastener to the gear assembly, the latter being secured by means of interconnected beater plates and ring gear plates. The housing is lockingly secured in relationship with the gear assembly by means of the penetration of the crank through an opening in the housing. The beaters are removably secured to the gear assembly by means of a preferably plastic molded socket-spline as shaft relationship, the splines on the beater plate being integral with the beater gears which, in turn, match with the ring gear. Gear ratios are selected between the bevel gear on the drive shaft, and the bevel gear on the beater plate to provide a two-to-one ratio, the ratio between the beater gears and the ring gear being five to one. These ratios result in two orbits of the beater plate for each rotation of the crank, and ten rotations of the beaters for each rotation of the crank. A bowl is provided of generally cylindrical cross section which may desirably be graduated to indicate its contents. The pouring spout of the bowl coacts with a spout key on the gear housing to secure the same atop the bowl; and similarly an egg separator coacts with the upper portion of the bowl and is coordinated in position by means of the pouring spout. An ejector, in the form of an elongated member penetrating through the hollow drive shaft, may be thumb pressed from a position opposite the crank handle mount of forcibly eject the crank handle from its coacting relationship with the drive shaft to thereafter easily remove the housing for disassembly, and cleaning of the housing, frank, gear assembly, and beaters as they may be separated from each other. The beaters are formed with a knife edge on both sides and a thickened center section. The knife edge promotes ease of penetration of the material being mixed, and the thickened center section directs the material being whipped centrally into the beaten zone interiorly of the tines. The lower extremeties of the beater tines are curved centrally with a continuation of the thickened center section in order to assist in stripping material off the bottom of the bowl, and also to assist draining when the tines are withdrawn from the material being beaten. The distance between the substantially vertical side walls of the bowl and the beater tines is proportioned for a relationship as close as possible, and yet one which will accommodate the centrifugal action separating the tines under heavy use without the tines contacting the bowl walls or base. The base of the bowl is radiused at its lower edge in a configuration approximating the curve of the lower portion of the tines.

In view of the foregoing, it is a primary object of the present invention to provide a whipper which minimizes the time required for whipping various mixers as compared to the known hand operated or even hand-held electric powered existing beaters. A related object of the present invention is to provide a whipper which is driven through an efficient gear train and with a highly efficient beater to permit manual operation by a person of modest strength. Still another related object of the present invention is to provide a whipper in which the crank handle operates in a natural full swing relationship eliminating the tiring wrist action of other hand operated beaters. By way of example, the hand operation of the subject whipper will whip cream in approximately forty seconds. Egg whites, on the other hand, can be whipped to the point that the bowl may be inverted without dripping in approximately fifteen seconds.

A further desirable object of the present invention is to provide a whipper with a plurality of separate beaters so that the unit remains self-standing for draining, and batter clinging to the tines will self-strip by gravity between operations.

Yet another important object of the present invention is to provide a whipper which can be self washed by adding a detergent and a small amount of water interiorly of the mixing bowl, and then agitating the same way as when whipping, the agitation simulating that of mechanical washing equipment.

Still another significant object of the present invention is directed to an orbital-type beater in which the parts may be readily disassembled for cleaning manually, and without the interaction of metal parts such as springs, detents, latches, and the like. This objective is achieved by providing a bayonet-type fastener between the housing and the gear assembly which is thereafter secured in place by means of the crank engaging the drive shaft through a matching port in the housing, thus securing the same against dislodgment.

Still another object of the present invention looks to the provision of beaters which are snap fittingly engaged to the beater gears, and which can be molded from plastic which provides the two-fold advantage of minimized corrosion, and economy of manufacture.

Still another object of the present invention is to provide a whipper, the parts of which can be quickly disassembled for washing in a dishwasher, or otherwise cleansing, and yet may be reassembled and positioned in the bowl for further use with any drippage or drainage passing into the bowl and thus rendering the same ready for restorage in a cupboard without dripping or affecting other items in the cupboard.

DESCRIPTION OF ILLUSTRATIVE DRAWINGS

Further objects and advantages of the present invention will become apparent as the following description of an illustrative embodiment proceeds, taken in conjuction with the accompanying drawings in which:

FIG. 3 is a further exploded view of the gear drive train, partially broken, and partially in section to illustrate the relationship of the parts.

FIG. 4 is a front elevation of the housing for the gear assembly.

FIG. 5 is a bottom view of the gear housing shown in FIG. 4 in the same scale as shown in FIG. 4.

FIG. 9 is an end view of the beater plate, partially sectioned and partially exploded to show the disassembled relationship between the bearing and the ring gear plate.

FIG. 10 is a bottom view of the beater plate in the same scale as shown in FIG. 9.

FIG. 11 is a front elevation of the beater plate bevel gear and the stub shaft extending therefrom.

FIG. 12 is a bottom view in slightly enlarged scale of the bevel gear of FIG. 11.

FIG. 13 is a front elevation showing the unitary beater gear and beater spline.

FIG. 14 is a front elevation of an exemplary beater showing the socket and related snap head connector partially in phantom lines.

FIG. 15 is a top view of the beater shown in FIG. 14 in the same scale as shown in FIG. 14.

FIG. 16 is a transverse sectional view looking downwardly along section line 15 - 15 of FIG. 14 of the beater.

DESCRIPTION OF PREFERRED EMBODIMENT

Figure 2:
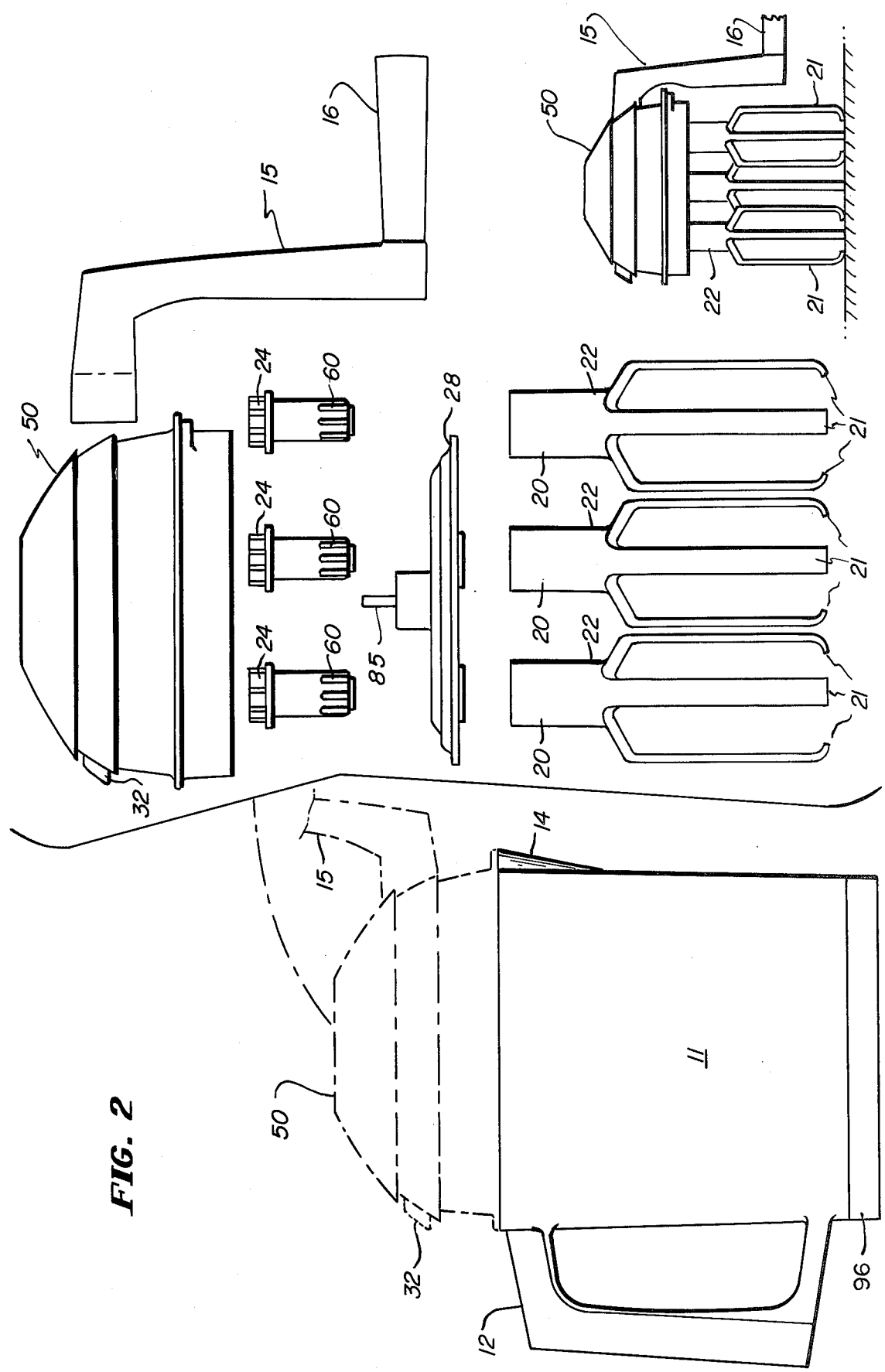
FIG. 2 is an exploded partially diagrammatic view illustrating the disassembled relationship between various of the elements.

The subject whipper is illustrated particularly in FIG. 2 of the accompanying drawings where it will be seen that the whipper 10, in front elevation, is provided with a handle 12 at one side for lifting the bowl 11, and is provided with a crank 15 at the other side for rotating the beaters 20. As illustrated, three beaters 20 are employed in the assembly, and are spaced on equilateral triangular centers, as disclosed in FIG. 10. The invention may also be practiced, however, with two beaters or four beaters, the number three being selected as a desirable selection of a plurality of beaters.

The housing 50 of the gear housing assembly 25 fits on top of the bowl 11 as shown in phantom lines in FIG. 2. Particularly to be noted is the coordinated relationship between the spout 14 on the bowl 11, and its interlocking relationship with the spout key 51 of the gear assembly housing 50. An upper stepped ring 56 and lower stepped ring 58 are provided in the housing 50 for the gear assembly 25. Thus, as shown particularly in the left-hand portion of FIG. 2, when the user operates the unit, either the left or the right hand interchangeably may be placed on top of the housing 50, the fingers as well as the palm of the hand engage the stepped rings 56, 58, and then the opposite hand is employed to rotate the crank 15. After the contents have been adequately whipped or beaten, the gear assembly 25 as well as the crank 15 are removed with the attached beaters 20, and the same may be positioned in a free standing configuration generally as shown in the right-hand portion of FIG. 2 in reduced scale. This configuration permits the tines of the beaters to drain onto a flat surface as shown. The bowl 11 may then be grasped by the handle 12 and the contents either poured out with the assistance of the spout 14, or removed by a spoon or spatula.

Figure 1:
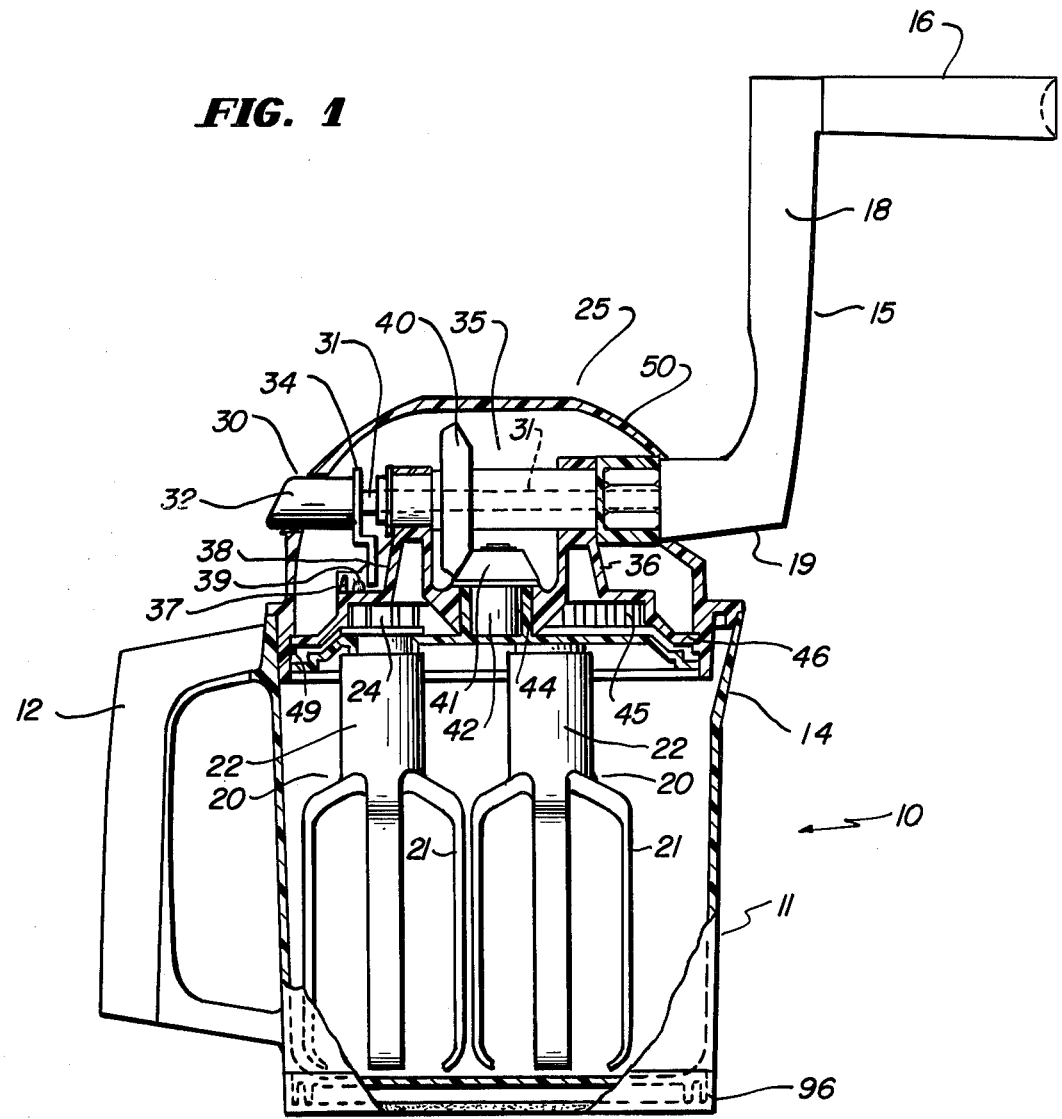
FIG. 1 is a partially cross-section view of the subject whipper broken in certain portions to illustrate various of the related coacting members.

In greater assembled detail, referring to FIG. 1, it will be seen that the crank 15 employs a grip 16, and a socket 19 at one end of the crank arm 18. The crank 15 is made substantially in accordance with Applicant's assignee's U.S. Pat. No. 3,406,590. The socket 19 of the crank 15 has a female hexagonal relief portion in its interior, and coactingly engages a crank hex 75 at the one end of the drive shaft 35. The drive shaft 35, pursuant to details to be described below, is journaled in a ring gear plate 26 which is housed within the housing 50 and is an integral part of the gear housing assembly 25. The drive shaft 3.˜ rotates a drive shaft bevel gear 40 which, in turn, coacts with a beater plate bevel gear 41 which rotates the beater plate 28. The annular area defined between the beater plate 28 and the ring gear plate 26 provides space for a plurality of beater gears 24 which are journaled in the beater plate 28 to coact with the internal ring gear 45 of the beater plate 28. Each of the beaters 20 is provided with a plurality of beater tines 21 which, as shown in FIG. 1, extend downwardly from the beater socket 22 with a substantially continuous center thickened cross section terminating in opposed knife edges and having a flat outer surface. A curved lower end portion leaves the bottom portion of the beater open, as specifically shown in FIG. 16, a cross-sectional view looking downwardly from section 15—15 of FIG. 14 which shows the beaters 20 in greater detail and having an isosceles trapezoidal cross section. The lower ends of the tines 21 have a modestly curved end (less than 45%) with a continuation of the thickened cross-section and knife edges. This permits an upward thrust to scour the bottom of the bowl 11 and yet allows the material to flow off the ends when the beaters 20 are removed from one bowl.

Another feature of the invention shown in broad outline in FIG. 1 is the provision of an ejector 30 which has an ejector shaft 31 terminating in an ejector button 32, the latter extending outside of the housing 50. The opposite end of the ejector shaft 31 abuts against one snap head 81 (see FIG. 3) of the crank socket 19, and when the button 32 is pressed, it presses against the snap head 81 and pops the crank 15 off of its otherwise secured interfitting hexagonal relationship 75, 80. In order to prevent the ejector button 32 from impeding the disassembly of the housing 50 from the gear assembly 25, the ejector 30 is provided with an ejector yoke 34 (as shown in FIG. 1), the lower extremity of the yoke being slightly yieldable to pass over the ejector stop 39, and thus, in the eject position, and button 32 is held inside the housing 50. Additionally, a snap lock 37 assists in assembly and prevents the ejector from falling out when the gear assembly is disassembled and washed. When the crank 15 is reinserted into its hex relationship 75, 80 with the drive shaft 35, the ejector shaft 31 is then pushed in the opposite direction and the ejector button 32 penetrates the ejector button hole 29 in position for again ejecting the crank 15. The yoke 34 then nests between the snap lock 37 and the ejector stop 39.

Additional details of the gear housing assembly 25 appear in the exploded view of FIG. 3 of the drawings. There it will be seen that the ring gear plate 26 is secured in its spaced relationship to the beater plate 28 by means of inserting the bevel gear pin 85 into the interior portion of the beater plate bevel gear 41, the coacting splined relationship being defined by the spline 88 which is interior of the gear socket 86 of the beater plate 28, and the spline teeth 89 on the stub shaft 42 of the lower portion of the bevel gear 41. In assembly, this attachment of the bevel gear pin 85 to the bevel gear 41 does not take place until the three beater gears 24 are positioned within the beater gear bearings 65 in the beater plate 28, generally as shown as to one such beater gear 24 at the left-hand portion of the beater plate 28 in FIG. 3. The beater gear 24, as noted in its orientation, is positioned to coact with the ring gear 45 of the ring gear plate 26. Thus when the crank 15 is rotated it rotates the drive shaft 35 which in turn couples the drive shaft bevel gear 40 with the beater plate bevel gear 41. The beater plate bevel gear 41 rotates the beater plate 28, and thus causes the beaters 20 to orbit within the bowl 11, and also to rotate as the beater gear 24 continues to travel in the circle around the ring gear 45.

The interlocking relationship between the beater 20 and the beater spline 60 beneath the beater gear 24 is shown at the lower left-hand portion of FIG. 3. There it will be seen that the beater 20 has a beater socket 22 at its upper portion. The beater socket 22 contains interiorly thereof an upward projection terminating in a snap head 70. The snap head 70 is proportioned to snap fittingly engage the collar 61 which is inside the beater spline 60. Thereafter the socket spline 71 coacts with the projections on the beater spline 60, and the elements are thus interrelated. Also to be noted is the sleeve 72 extending at the upper portion of the beater socket 22 which slidingly coacts with the guide shirt 68 extending downwardly from an integral with the beater plate 28 to further insure the positional orientation of the beater 20 while it rotates and orbits within the bowl 11.

One of the stated objects of the invention of the subject whipper 10 is to provide for the disassembly of the parts, including the housing 50 being removed from the gear housing assembly 25 for cleaning, the crank 15 being removed further for cleaning, and the beaters 20 being removable from the gear housing assembly 25. These methods of removal, with the exception of the disengagement of the housing 50 from the gear housing assembly 25 have been shown and described above. By referring to FIGS. 4 and 5, it will be seen that the gear housing 50, and its underneath portion, is provided with opposed interlock keys 49 which are a segmented portion. The keys, in turn, are assisted in an adjacent area by the locator stops 64 of the ring gear plate 26 which terminate the rotational bayonettype connection between the housing 50 and the locking portion defined coactingly between the ring gear plate and beater plate 26,28.

Figure 7:
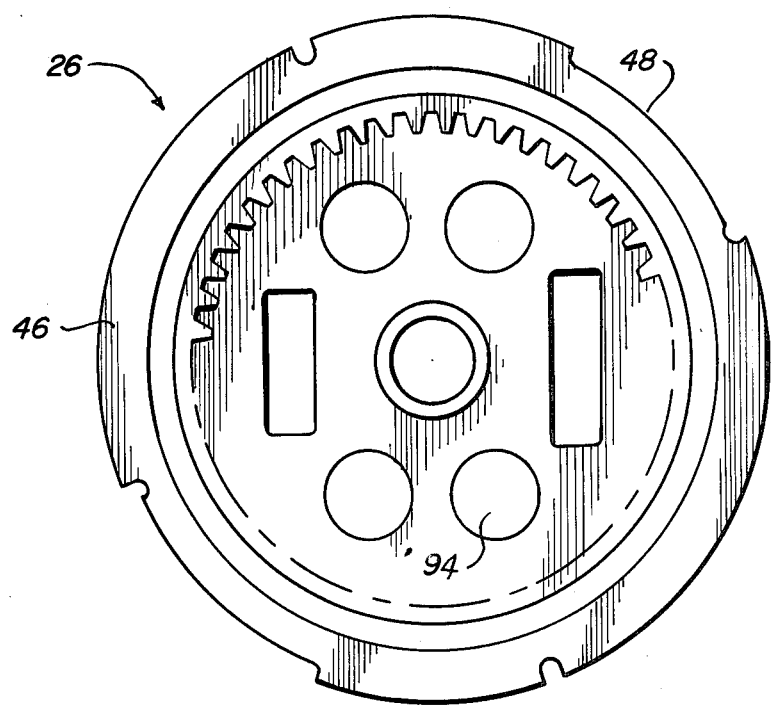
FIG. 7 is a bottom view of the ring gear plate as shown in FIG. 6 and in the same scale as FIG. 6.

Turning now to FIG. 7, it will be seen that the ring gear plate 26 is provided with an interlock key segment 48 cut out of the interlock ring 46 and proportioned to coact with the interlock key 49 of the housing 50. The relative positions of the interlock key 49 and the interlock key segment 48 are such that when the locator stop 64 is encountered, the crank hex 75 will be positioned directly opposite the crank hex hole 52 in the housing 50, and the ejector button 32 will be positioned directly opposite the ejector button hole 29 in the housing 50. Thus when the interlock key 49 and the interlock key segment 48 have been properly aligned and brought against the interlock locating stop 64, the elements are in position for the hex socket 80 of the crank 15 to be thrust over the crank hex 75 of the drive shaft 35, the "ready position" being shown at the upper right-hand corner of FIG. 3. As the crank hex 80 is inserted over the drive shaft hex 75, the interior snap head 81 of the crank 15 advances in order to engage the interior hex collar 76 of the drive shaft hex 75. At the same time, the end of the snap head 81 engages the right-hand end of the ejector shaft 31 (as shown in FIG. 3) and pushes the ejector 30 to the left so that the ejector button 32 passes through the ejector button hole 29 in the housing 50, while the lower portion of the ejector yoke 34 pops over the ejector stop 39 which is in the upper portion of the ring gear plate 26.

Figure 6:
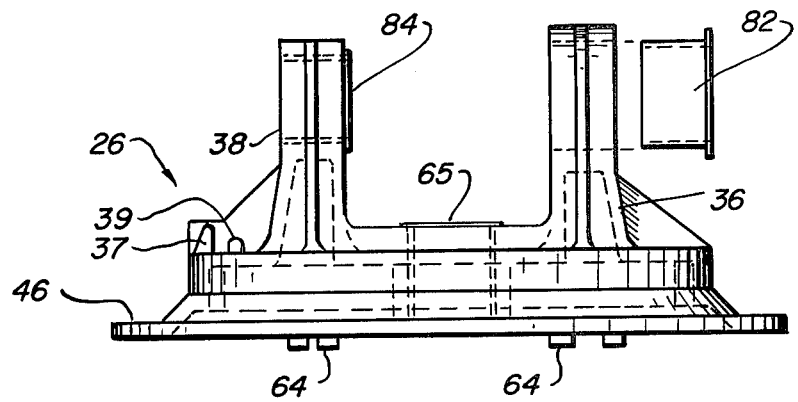
FIG. 6 is a front elevation of the ring gear plate showing a bearing in disassembled relationship.
Figure 8:
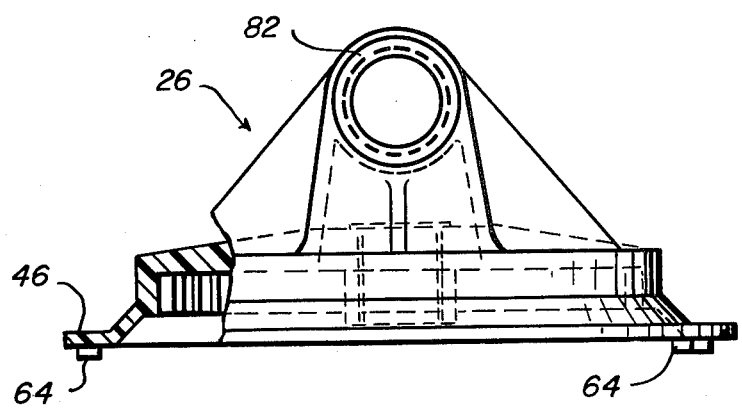
FIG. 8 is an end view, partially sectioned, of the ring gear plate in the same scale as FIGS. 6 and 7 but taken from the right end of FIG. 6.

The specific construction of the ring gear plate 26 is shown in FIGS. 6 through 8. There it will be seen that the ring gear plate 26 terminates at its base in an outer peripheral interlock ring 46 as described. The ring gear 45 is molded as an internal ring gear in the underneath portion of the ring gear plate 26. Extending upwardly from the ring gear plate 26 are opposed crank end bearing support 36 and ejector end bearing support 38. Each of these have an interior molded through bore to press fittingly receive the crank end bearing 82 and the gear end bearing 84. The drive shaft 35 is passed through the bearings 82, 84 and secured in place by means of the coacting relationship between the bevel gears 40, 41. Extending downwardly from the ring gear plate 26 are a plurality of locator stops 64, particularly as shown in FIG. 8, which coact with the interlock key segment 48 and interlock key 49 to align the opposed holes in the housing 50 prior to the reassembly of the crank 15 onto the gear housing assembly 25 as described above. Also to be noticed, particularly in FIG. 7, is the provision of a plurality of drain holes 94 in the ring gear plate 26 for purposes of permitting contained water, typically deposited during a dishwashing cleaning, to drain from the gear housing assembly 25.

The details of construction of the beater plate 28 are shown particularly in FIGS. 9 and 10. There it will be seen that the beater plate 28 terminates in the upwardly positioned gear socket 86, with the gear pin 85 extending upwardly from the center as described above. Provision is made with bearing holes 92 in the beater plate 28 for the press fitting insertion of the beater gear bearing 65. The beater gear bearing 65, in turn, receives the beater spline 60 of the beater gear 24, as shown in FIG. 13. The shoulder 62 immediately beneath the beater gear 24 rides atop the flange portion 66 at the upper end of the beater gear bearing 65. The beater gear spline 60 extends beneath the guide shirt 68 of the beater gear plate 28. Also to be noted is the provision of a splash ring 95 which extends around the entire periphery of the beater plate 28, and is intended to fit within the bowl 11 in close spaced proximity to its upper interior edge portion thereby coacting with the splash rim 55 of the housing 50 to prevent the contents of the bowl 11 from escaping around its upper portion while the beating action takes place. The upper edge of the splash ring 95 also coacts with seating ring 59 of the housing during assembly. In addition, the bowl shirt 54 extends downwardly from the housing 50, and penetrates the interior portion of the bowl 11 particularly as shown in FIG. 1.

Interior snap ring attachments are contemplated at various points. For example, a snap ring 90 is provided to secure the upper portion of the bevel gear pin 85 atop the bevel gear 41 as shown in FIG. 3. Additionally, a further snap ring 79 is positioned against the shoulder 78 of the drive shaft 35 in order to lock the drive shaft 35 in position interiorly of the bearings 82, 84 provided for the drive shaft.

In order to secure the unit against dislodgment while hand held atop a working surface, such as Formica table, a rim 96 (see FIG. 1) is provided around the periphery of the base of the beater 11. This rim is molded with an interior rib construction 98 which in turn coacts with the tongue and groove circular construction 99 molded at the lower portion of the bowl 11 to secure the resilient ring 96 underneath the bowl 11. Thus, when the operator positions the hand on top of the housing 50, and rotates the crank 15 by grasping the crank grip 16, the unit is secured in position and tipping, slippage, or other dislodgment is avoided by means of the pressure relationship between the hand atop the housing 50, and the rim base ring 96 on the surface on which it is being worked.

The ratios between various gears figure significantly in the efficiency of operation of the whipper 10. Ideally in the commercial unit, the drive shaft bevel gear 40 has 24 teeth, and the beater plate bevel gear 41 has 12 teeth thus resulting in a two-to-one relationship between the drive shaft bevel 40 and the beater bevel 41. With this relationship, a single turn of crank 15, results in two orbits of the beater plate 28 and the associated beaters 20. Further, each of the beater gears 24 has ten teeth, whereas the internal ring gear 45 has 50 teeth. Therefore for each rotation of the beater plate 28, there are five rotations of the beaters 20. Stated more specifically in functional language, for one turn of the crank 15 there are two orbits of the beaters 20, and ten turns of the beaters 20. Because there is only a single beater gear coordinated with the internal ring gear at three locations, internal friction is significantly reduced, and yet the four tines 21 of the beaters 20 are rapidly passed through the contents of the bowl 11 and, aided by the isosceles triangular cross section of the tines 21, are quickly aerated without flogging the contents, or degrading the contents (such as whip cream from cream to butter) but rather aerating and fluffing the same quickly. In addition, the gear ratios are coordinated with the beaters 20, and the length of the handle 15, so that the average homemaker finds little major resistance to 15 to 20 seconds of operation which is normally all that is required to fluff the whites of two eggs.

Figure 17:
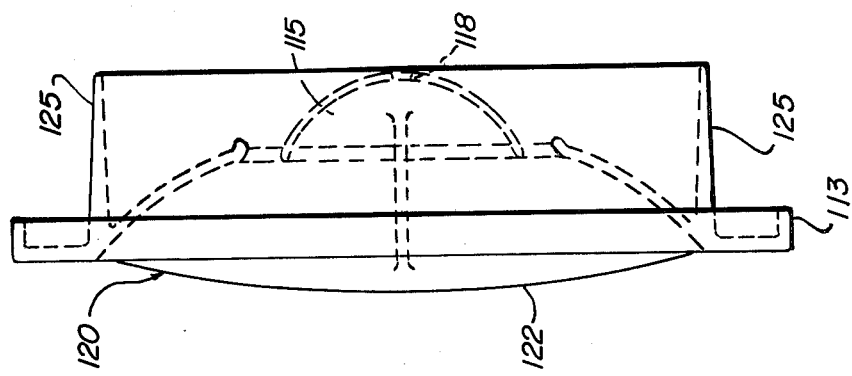
FIG. 17 is an end view of an egg separator used in combination with the bowl of the subject whipper.
Figure 18:
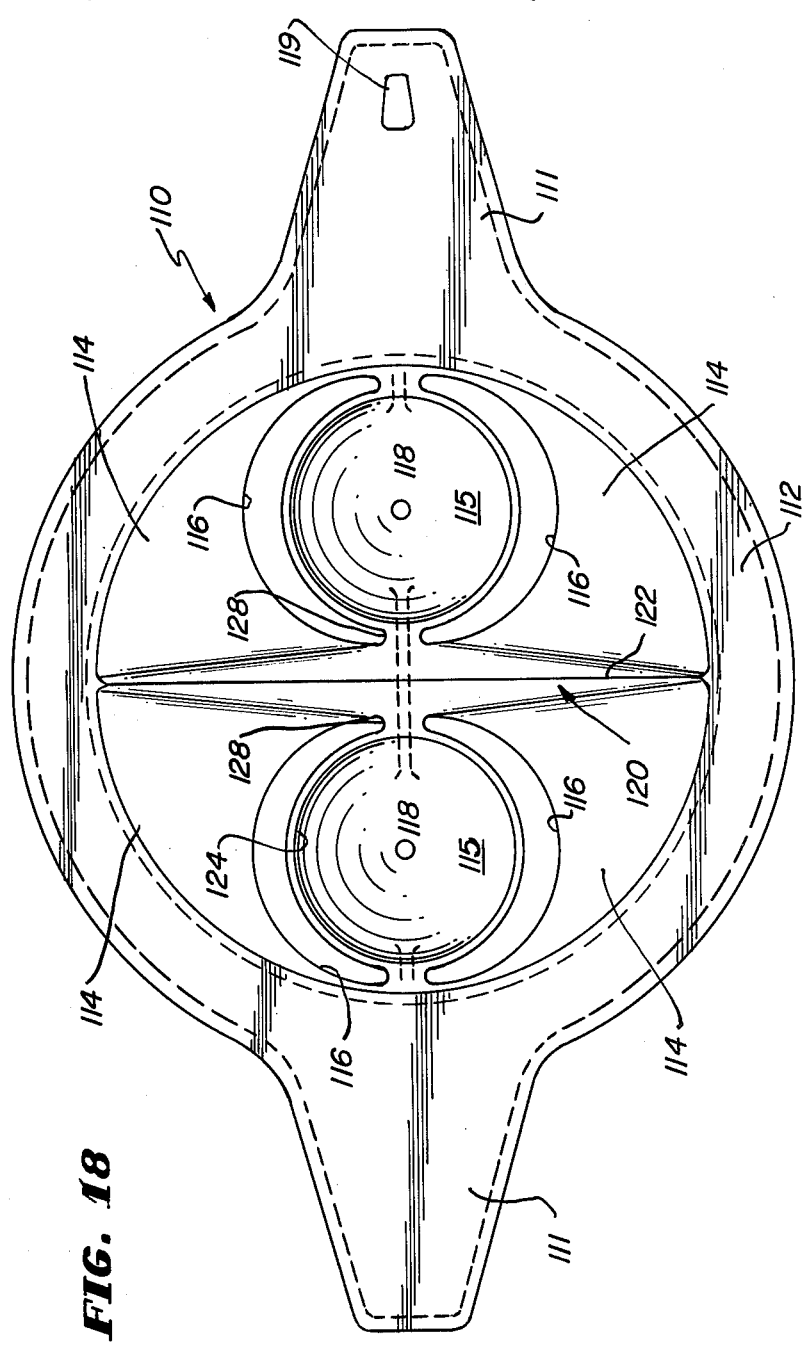
FIG. 18 is a plan view of the egg separator in the same scale as FIG. 17.
Figure 19:
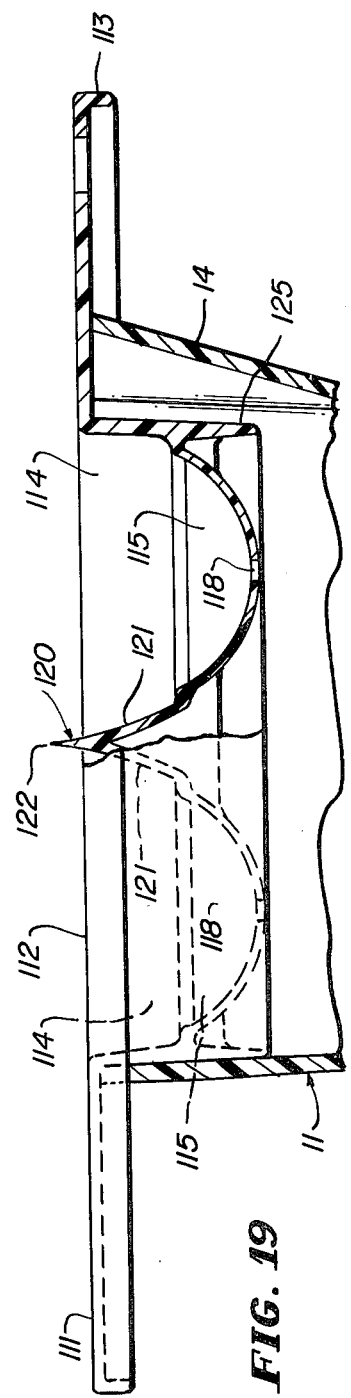
FIG. 19 is a front elevation of the egg separator of FIGS. 17 and 18 in partial section, partial phantom lines, and showing in broken lines the coacting relationship between the egg separator and the whipper bowl.

A further desirable feature of the whipper 10 is its ability to accommodate a double egg separator 110 of the character shown in FIGS. 17 through 19 of the accompanying drawings, and more particularly as specifically set forth in co-pending patent application Ser. No. 361,430 filed May 18, 1973, entitled "Double Egg Separator". For purposes of detailed description, the aforesaid patent application description is incorporated herein by reference. For purposes of review, however, it will be seen that the double eggs separator 110 includes a pair of opposed support ears 111 connected, as shown in FIG. 18, by a support rim 112 having a depending support skirt 113. Drain walls 114 depend from the support rim 112 and a plurality of spiders 128 support a pair of yolk cups 115 in the central portion of the drain walls 114, separated by drain slots 116. Conveniently, a hanging hole 119 is provided in one of the support ears 111 for securing the same on a hook or nail normally mounted on the wall. Centrally of the egg separator 110 is a cracker 120 having a flanking pair of cracker walls 121 and terminating at its upper edge in a cracker edge 122. A stand ring 125 is provided around the entire under-surface of the double egg separator 110, for the two-fold purpose of positioning the same on a flat surface, or alternatively for nesting the same interiorly of the bowl 11 of the whipper 10. In addition, the underneath portion of the support ears 111 in combination with the support rim 112 and support shirt 113 overlap and receive in oriented nested relationship the spout 14 of the bowl 11 of the whipper 10.

Therefore, when preparing an omelet, for example, two eggs may be separated in the double egg separator 110 with the yolks nesting in the yolk cups 115 while the balance of the egg white drains through the drain slots 116 and the cup drain 118. Thereafter the double egg separator 110 may be removed from the bowl 11, the whipper 10 activated to froth the egg whites while the double egg separator 110 sits on a flat surface, and the egg yolks thereafter dropped into the bowl 11, and mixed by quickly agitating again with the whipper 10. The result is a light fluffy omelet mix which can be thereafter spooned or folded onto a skillet or omelet maker producing a delicious omelet serving two to four people, depending upon their appetites.

Although the dimensions are not critical to the invention, certain proportions are highly desirable in usage. For example, in the commercial embodiment the diameter of the bowl 11 is nominally five inches, as is its depth. This permits the height of approximately 3 ½ inches to be graduated from 0 to 32 ounces, and yet leaving clearance at the top for frothing and aeration within its intended expansion of the materials being mixed. The beater tines 21 have a nominal length of 2¾ inches, and an opposed spacing of 1⅝ inches. The length of the beater socket 22 is coordinated with the beater plate 28 so that the lower ends of the tines 21, bent slightly centrally, are positioned closely adjacent to the bottom of the bowl 11. The shaft bevel gear 40 has 24 teeth, and the beater plate bevel gear 41 has 12 teeth. The beater gears 24 are provided with 10 teeth, and the ring gear 45 with 50 teeth. As indicated above, one rotation of the hand crank 15 provides two orbits for the beater plate 28, as well as the beaters 20. During the course of the two orbits resulting from a single rotation of the hand crank 15, each of the three beaters will rotate ten times. When observing the operation of the beaters 20 through the bottom of the bowl 11, a virtual blur of activity whipping and aerating the contents of the bowl 11 is observed. It is this extensive agitation produced in a short period of time which results in excellent aeration and mixing of the contents of the bowl 11, whether the same be egg whites, whipping cream, a chocolate milk drink for the children, or a favorite beverage for the adults.

Because the whipper 10 is readily disassemblable as set forth above, the various parts can be easily washed, and preferably in a dishwasher. To this end, the gears and beaters may be desirably formed from 101 nylons supplied by the Du Pont Company. The bowl 11, gear plate 26 and beater plate 28 as well as the housing 50 can be molded of S.A.N., an acrylanitrile manufactured by the Dow Chemical Company and also known as tyrill 880. If substitute materials are sought, they are desirably ones which will withstand the higher temperature ranges experienced in the normal dishwasher, although for economy purposes, the unit could be molded out of a lesser plastic. The same comments apply, of course, with regard to the double egg separator 110.

In review it will be seen that a whipper 10 has been disclosed and described which is efficient and high speed in operation. The same has the desirable features of a free standing beater assembly, while the bowl 11 may be used for other purposes. In addition, a double egg separator 110 is adapted for coordinate usage with the bowl 11. Furthermore, the entire whipper 10 takes up little more space in a cupboard than an ordinary mixing bowl, and yet affords the numerous additional features inherent in the above description and the product as shown in the accompanying drawings.

Although particular embodiments of the invention have been shown and described in full here, there is no intention to thereby limit the invention to the details of such embodiments. On the contrary, the invention is to cover all modifications, alternatives, embodiments, usages and equivalents of a whipper as fall within the spirit and scope of the invention, specification and the appended claims.

I claim:

1. A whipper comprising, in combination,
a uniform cross-sectional bowl having a base,
a handle extending from one side of said bowl for holding the same,
a pouring spout at the upper portion of said bowl opposed to said handle,
an orbital beater mechanism for securing atop said bowl,
said orbital beater mechanism including a plurality of beaters, each of which terminates at a distance substantially the same from the bowl base,
a key in said orbital beater mechanism for coacting with the spout of the bowl to position the same,
a dome atop the orbital beater mechanism and housing the same,
at least one horizontal circular stepped ring on the gear housing dome for engagement by the hand in slip resistant relationship,
a resilient ring at the base of said bowl to frictionally engage a surface upon which the bowl and its associated orbital beaters are activated,
a hand crank for activating the orbital beater mechanism with a motion in a plane parallel to the longitudinal axis of the bowl and diametrically opposed to the bowl handle, whereby a single hand may be placed atop the dome thereby securing the same in position and pressing the lower portion of the bowl against a surface in frictional resistant relationship thereto, to the end that one hand rotates the crank with a free swing wrist-free action and the other hand placed on the dome secures the bowl against the surface.

2. In combination with the whipper of claim 1, for sequential use with the whipper for separating egg whites, storing the egg yolks, and thereafter optionally mixing the yolks with the whipped egg whites while the beater head is removed from the bowl,
an egg separator having a support ear,
a support rim connecting the support ear with the body of the separator,
a shirt depending from said support rim,
the support rim and shirt being proportioned to overlie and nestingly engage the bowl top,
said ear being proportioned to overlie the bowl spout, whereby the egg separator is adaptable for use with the bowl to drain egg whites into the bowl for subsequent whipping when the egg separator is removed from the bowl.

3. In the whipper of claim 1,
each beater having a socket thereatop,
each beater gear having a depending spline,
each spline having an interior collar,
each socket having an interior spline proportioned to coacting by engaging the beater gear spline,
and a snap head interior of each socket to snap-actingly engage the beater gear spline interior collar thereby removably securing each beater to one beater gear.

4. In the whipper of claim 1,
a handle on said crank and substantially perpendicular to said crank,
said crank having a maximum length compatible with finger and knuckle passageway between the handle and a surface upon which the bowl is operated.

5. In the whipper of claim 1,
each said beater having a tine having an inwardly curved lower portion,
said bowl having a radiused lower inner portion proportioned complimentary to the curvilinear lower portions of said tines, whereby a close proximate mixing action takes place between the lower portion of the beater tines and the lower portion of the bowl and side walls.

6. A whipper comprising, in combination,
a gear housing,
a bowl of substantially uniform cross section having side walls and a base,
a bowl skirt depending from said gear housing proportioned to coact with the sidewalls of the upper portion of the bowl,
a support interiorly of the gear housing for a plurality of gears,
said support having a peripheral ring,
an interlocking key element on said ring,
an interlocking key element interior of said gear housing,
an opening in said housing for penetration by a crank,
said key elements being positioned and coordinating whereby on rotation of the same the opening in the housing for positioning of the crank is fixed,
and drive shaft means interior of the housing and secured to the support,
and means on one end of said drive shaft for interlocking said crank,
whereby upon insertion of the crank through the opening in the housing the interlocking between the housing and the support is secured by the penetration of the crank through the opening in the housing.

7. In the whipper of claim 6,
a plurality of beaters being of uniform size and length and interchangeable,
each beater having open ended depending tines of uniform length,
whereby the beater assembly separated from the bowl is free standing in the upright position to facilitate interim positioning and promote drainage cleaning of the beater tines.

8. In combination with the whipper of claim 7,
an egg separator having a pair of opposed support ears,
a support rim connecting said ears,
a skirt depending from said support rim,
the support rim and skirt being proportioned to overlie and nestingly engage the bowl top,
a spout on said bowl top,
one of said ears being proportioned to overlie the bowl spout,
whereby the egg separator is adaptable for use with the bowl to drain egg whites into the bowl for subsequent whipping when the egg separator is removed from the bowl.

9. In the whipper of claim 7,
each beater having a socket thereatop,
each beater gear having a depending spline,
each spline having an interior collar,
each socket having an interior spline proportioned to coacting by engaging the beater gear spline,
and a snap head interior of each socket to snap-actingly engage the beater gear spline interior collar thereby removably securing each beater to one beater gear.

10. In combination with the whipper of claim 6, for sequential use with the whipper for separating egg whites, storing the egg yolks, and thereafter optionally mixing the yolks with the whipped egg whites while the beater head is removed from the bowl,
an egg separator having a support ear,
a support rim connecting the support ear with the body of the separator,
a skirt depending from said support rim,
the support rim and skirt being proportioned to overlie and nestingly engage the bowl top,
a spout on said bowl,
said ear being proportioned to overlie the bowl spout, whereby the egg separator is adaptable for use with the bowl to drain egg whites into the bowl for subsequent whipping when the egg separator is removed from the bowl.

11. An orbital whipper comprising, in combination,
a gear assembly including a ring gear and a plurality of beater gears coacting with the ring gear,
a beater plate journaling the beater gears for orbital movement while the beater gears rotate,
a plurality of beaters removably secured to the beater gears,
a crank,
a bevel gear means and a drive shaft coupling the crank to rotate the beater plate and beater gears,
said crank rotating in a plane substantially perpendicular to the plane of the ring gear and beater plate,
said plurality of beaters comprising at least three beaters located on equidistant radial and circumferential spacing each from the other beneath the beater plate,
each beater having at least three depending tines open ended at their lower extremities and each beater being interchangeable with the others,
said gear assembly being connected to rotate all beaters in one direction and orbit the beaters in the opposite direction,
said gear assembly having a ring gear plate,
said bevel gear means having a bevel gear secured to the drive shaft,
said bevel gear means having a beater bevel gear journaled in the ring gear plate and secured to the adjacent beater plate,
said bevel gear to said beater bevel gear having a 2:1 ratio and said ring gear to said beater gears having a 5:1 ratio, whereby these ratios result in two orbits of the beater plate for each rotation of the crank and ten rotations of the beaters for each rotation of the crank,
whereby the gear assembly, beaters and crank is a free standing assembly atop the open ends of the beater tines for storage and drainage of the beaters.

12. In a whipper of claim 11,
an ejector having an elongate body,
means defining a hollow bore through the drive shaft,
a housing for said gear assembly,
said ejector having a button at one end extending through the housing with its opposite end positioned to engage the crank and dislodge the same when the button is pressed, whereby the handle may be ejected by press-button action.

13. In the whipper of claim 12,
said ejector having a depending yoke adjacent the button,
and an ejector stop interior of the housing to snap actingly engage the yoke.

14. In the orbital whipper of claim 11,
said ring gear plate having said ring gear positioned interiorly thereof,
said drive shaft being secured to the ring gear plate in substantially parallel orientation with the plane of ring gear, each of said beater gears having a beater spline extending downwardly therefrom and through the beater plate, and coacting spline means in a socket at the upper portion of said beaters for removably securing the beaters to the beater gear depending spline shaft, whereby the beaters may be removably secured to the gear assembly, each for separate cleaning.

15. In the whipper of claim 14, a plurality of drain holes in the ring gear plate whereby the space between the ring gear plate and the beater plate can be readily drained after washing.

16. In the whipper of claim 14, an ejector having an elongate body, means defining a hollow bore through the drive shaft, said ejector having a button at one end extending through the housing with its opposite end positioned to engage the crank and dislodge the same when the button is pressed whereby the handle may be ejected by press button action.

17. In the whipper of claim 16, said ejector having a depending yoke adjacent the button, and an ejector stop atop the ring gear plate to snap-actingly engage the yoke.

18. In the whipper of claim 11, each beater having a socket thereatop, each beater gear having a depending spline, each spline having an interior collar, each socket having an interior spline proportioned to coacting by engaging the beater gear spline, and a snap head interior of each socket to snap-actingly engage the beater gear spline interior collar thereby removably securing each beater to one beater gear.

19. An orbital whipper comprising, in combination, a gear housing, a crank, a beater plate at the bottom of said housing, a plurality of beater gears each having a depending spline extending downwardly through the beater plate, collars surrounding a portion of said beater gear splines extending downwardly from the beater plate, an inwardly extending collar interiorly of the beater gear spline defining a neck therein, a plurality of beaters having sockets thereatop proportioned to receive the beater gear splines and collars, a snap acting split head in the socket and beater gear spline to removably secure the beater to the beater gear when inserted into the beater gear collar.

20. In the whipper of claim 19, said beaters being of uniform size and length and interchangeable, each beater having at least three open-ended depending tines of uniform length, whereby the beater assembly separated from the bowl is free standing in the upright position to facilitate interim positioning and promote drainage cleaning of the beater tines.

21. An orbital whipper for a plurality of beaters, and a removable beater characterized by, means for rotating a beater, a beater, a socket atop the beater, said socket having means for removably securing the same to the orbital whipper, a plurality of parallel open ended tines extending downwardly from said socket, each tine having opposed knife edges, each tine having a central thickened section and uniform cross section of isosceles trapezoidal configuration, each tine having a centrally curved lower extremity, the curve being less than 45°, said lower extremity having a central thickened portion, all said lower extremities terminating in a plane perpendicular to the axis of the tines, whereby the thickened portion of the tine drives mixed substances centrally of the beater and the lower curved portion strips the bottom of a bowl and yet upon withdrawing the beater from the mixed substances they will drain from the lower curved ends of the tines.

22. In the whipper of claim 21, a plurality of beater gears, each beater gear having a depending spline, each spline having an interior collar, each socket having an interior spline proportioned for coacting by engaging the beater gear spline, and a snap head interior of each socket to snap-actingly engage the beater gear spline interior collar thereby removably securing each beater to one beater gear.

23. In a whipper having a gear housing assembly, including a ring gear plate and a beater plate, said ring gear plate having a ring gear, a drive shaft secured to the ring gear plate in substantially parallel orientation with the plane of the ring gear, 90° gear means secured to said drive shaft, a crank for rotating the drive shaft to actuate the 90° gear means to rotate the beater plate, a plurality of beater gears journaled within the beater plate to coact with the ring gear, each of said beater gears having beater securing means extending downwardly therefrom and through the beater plate, the improvement consisting essentially a plurality of beaters coupled to the beater securing means, said plurality of beaters comprising three beaters located on equidistant radial and circumferential spacing each from the other beneath the beater plate, all of said beaters having a gear connection coacting with the ring gear formed and proportioned so that each beater rotates in the same direction as the adjacent beater, all of said beaters being positioned with reference to the beater plate so that said beaters rotate in the same orbital path, and said gear means to rotate on the beater plate being connected to rotate said beater plate in a direction opposite the direction of rotation of each such beater, the beaters being of uniform size and length and interchangeable, each beater having open ended depending tines of uniform length, said tines each having a linear uniform cross-section with lateral edges defining oppositely disposed cutting edges, whereby the beater assembly separated from the bowl is free standing in the upright position to facilitate interim positioning and promote drainage cleaning of the beater tines.

24. In the whipper of claim 23,
a plurality of drain holes in the ring gear plate whereby the space between the ring gear plate and the beater plate can be readily drained after washing.

25. In the whipper of claim 24,
at least three beaters being of uniform size and length and interchangeable,
each beater having at least three open ended depending tines of uniform length,
whereby the beater assembly separated from the bowl is free standing in the upright position to facilitate interim positioning and promote drainage cleaning of the beater tines.

26. In the whipper of claim 25,
an ejector having an elongated body,
means defining a hollow bore through the drive shaft,
said ejector having a button at one end extending through the housing with its opposite end positioned to engage the crank and dislodge the same when the button is pressed whereby the handle may be ejected by press button action.

27. In the whipper of claim 23,
an ejector having an elongated body,
means defining a hollow bore through the drive shaft,
said ejector having a button at one end extending through the housing with its opposite end positioned to engage the crank and dislodge the same when the button is pressed whereby the handle may be ejected by press button action.

28. In the whipper of claim 27,
said ejector having a depending yoke adjacent the button,
and an ejector stop interior of the housing to snap actingly engage the yoke,
whereby when the ejector button is activated the yoke is captivated in the eject position.

* * * * *